United States Patent [19]

Moshier

[11] 4,228,498

[45] Oct. 14, 1980

[54] MULTIBUS PROCESSOR FOR INCREASING EXECUTION SPEED USING A PIPELINE EFFECT

[75] Inventor: Stephen L. Moshier, Cambridge, Mass.

[73] Assignee: Dialog Systems, Inc., Belmont, Mass.

[21] Appl. No.: 841,390

[22] Filed: Oct. 12, 1977

[51] Int. Cl.[2] .................... G06F 15/20; G06F 15/34
[52] U.S. Cl. .................................................. 364/200
[58] Field of Search ...................... 364/200 MS File; 179/1 SA

[56] References Cited

U.S. PATENT DOCUMENTS

| | | | |
|---|---|---|---|
| 3,462,742 | 8/1969 | Miller et al. | 364/200 |
| 3,938,098 | 2/1976 | Garlic | 364/200 |
| 4,060,848 | 11/1977 | Hyatt | 364/200 |

*Primary Examiner*—Harvey E. Springborn
*Attorney, Agent, or Firm*—Kenway & Jenney

[57] ABSTRACT

A computing apparatus having at least three buses and a plurality of elementary function modules in circuit connection therewith, provides increased execution speed by implementing a pipeline effect. Each module is connected to at least one of the buses and at least one of the modules is connected to at least three of the buses. The buses each comprise a plurality of individual lines organized into groups: a group of source address lines, a group of destination address lines, and a group of data carrying lines. A control element is connected to each of the buses for directing the operation of the apparatus and the control element places source and destination addresses on the bus source address and destination address lines respectively for effectively connecting or configuring the function modules according to a selected program controlled configuration. The apparatus is useful in carrying out a plurality of machine operations during a single machine instruction cycle.

16 Claims, 6 Drawing Figures

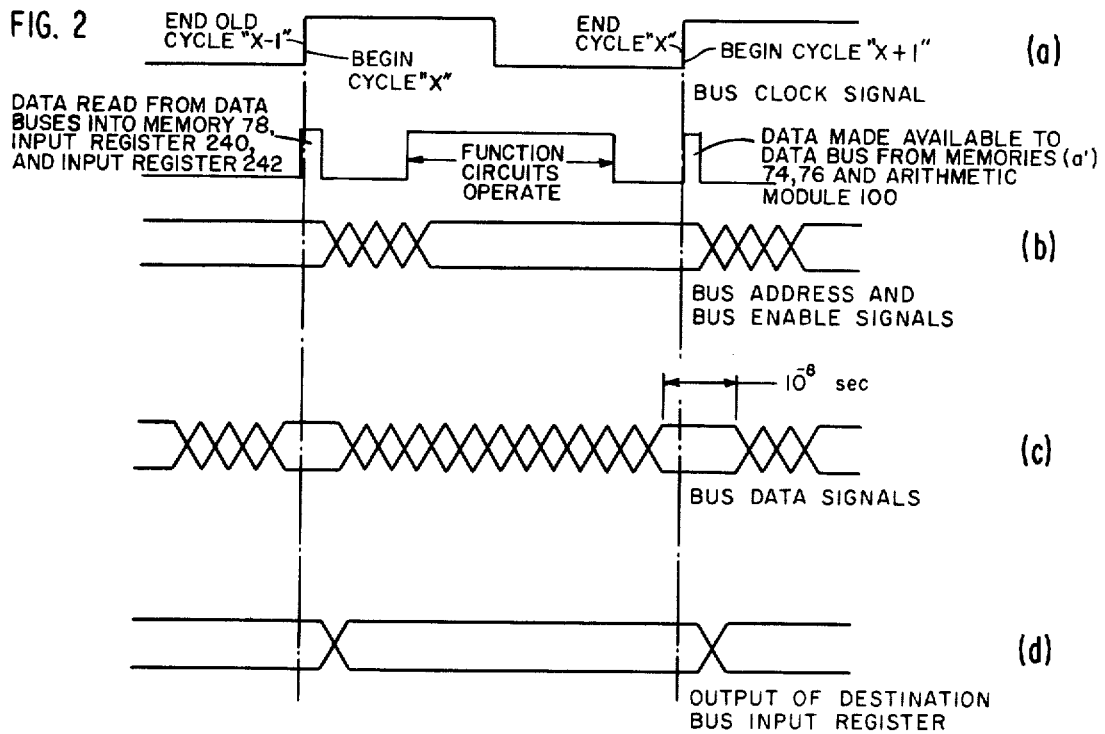
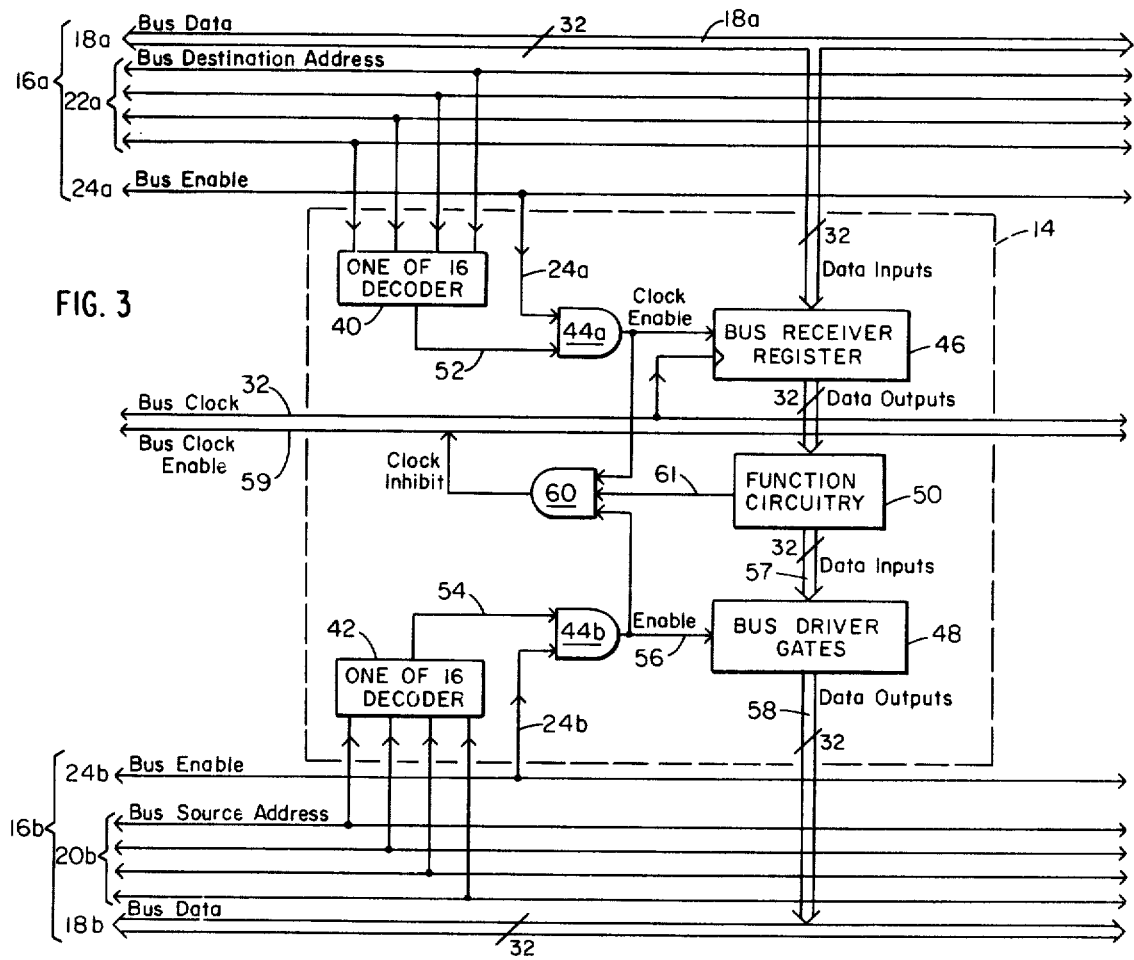

MULTIBUS PROCESSOR FOR INCREASING EXECUTION SPEED USING A PIPELINE EFFECT

This invention relates generally to computers, and in particular, to a data processor designed to process arrays of data at a very high execution speed.

BACKGROUND OF THE INVENTION

Great forward strides have been made in the field of computer technology to increase the instruction execution rate for small, medium, and large computer processors. The progress has come both in connection with hardware structure and components and with software techniques. In addition, the introduction of the microprocessor, in combination with large scale integrated circuit techniques, has led the processor manufacturers to more complex and sophisticated apparatus capable of solving the problems of both the generalist and the specialist.

The application of computer technology to the special purpose processor has increased the speed and operation of computers for special applications. To this end, many computer systems have been developed, specifically directed to such specialized areas as pattern recognition, statistical estimation, bit packing and unpacking, business and accounting problems, etc. Often, the designers of prior art equipment have incorporated into their devices the latest technological advances which utilize complex hardware interactions and machine cycles each having a plurality of clock timing pulses to increase the effective rate of machine operation.

Older methods of increasing the effective speed of a machine are also well known. Thus the use of several parallel paths of processing (often called parallel processing) to perform several different computational tasks or manipulative steps simultaneously has often been used. Typically, the organization of the parallel processor provides a plurality of individual processors or functional units permanently connected in parallel. Each unit or processor either operates on a separate and often separable "piece" of a problem usually simultaneously, or alternately, a plurality of units or processors are configured or wired to provide a pipeline effect whereby the intermediate results of computation are passed to consecutive processors, to determine a desired end result. The processors or units in these embodiments are however usually complex elements often capable of acting as complete processors themselves, and even when the units or processors are elemental in nature, the configuration and flow of data is substantially fixed and rigid.

The design of a computing apparatus using present day devices is well known in the art according to standard textbook procedures, however, the available computing apparatus have herebefore been unable to process large amount of data in real time as required for example by the speech analysis apparatus described in Moshier, U.S. Pat. No. 4,038,503, issued July 26, 1977 to the assignee of this invention.

A principal object of this invention is therefore to provide a data processing apparatus having an increased effective execution speed for processing arrays of speech and speech related data in real time. Further objects of the invention are to provide a data processing apparatus having a simple and flexible structure, which is reliable, which executes several machine operations in a single instruction cycle time, which incorporates a "pipeline" effect, and which uses high speed commercial components.

Other objects of the invention are to provide a data processing apparatus which is directed to the real time processing of large arrays of data, which can interact with a host computer, and which flexibly configures, under program control, a plurality of elementary function modules to process the data.

SUMMARY OF THE INVENTION

The apparatus according to the invention features a plurality of function modules and at least three buses, each function module being connected to at least a portion of at least one of the buses and at least one of the function modules being connected to at least a portion of each of at least three of the buses. Each bus comprises a plurality of individual lines, and the individual lines are organized into at least three groups: a group of source address lines, a group of destination address lines, and a group of data carrying lines. The apparatus further features a control element, the control element being connected to all of the buses for directing the operation of the function modules and for placing source and destination addresses on said bus source address and destination address lines respectively, for effectively connecting the function modules in a selected, program controlled, configuration.

An apparatus according to the preferred embodiment of the invention, for carrying out a plurality of elemental machine operations during one instruction cycle features a plurality of elementary function modules, each function module being connected to at least a portion of at least one of a plurality of buses, and at least one of the modules being connected to at least a portion of each of at least three of the buses. Each bus features a plurality of individual lines, the individual lines being organized into at least three groups: a group of source address lines, a group of destination address lines, and a group of data carrying lines. A control element, the control element being connected to all of the buses, directs, in response to a stored program, the operation of the function modules. The control element also has the capability of configuring the apparatus for carrying out at least four elemental operations within one instruction cycle.

In a particular embodiment of the invention, each bus features a bus enable line for signalling when the bus is enabled. Each bus enable line is connected to and is controlled by the control element. The preferred embodiment of the invention further features three buses, at least three memory elements, and an arithmetic module. In this embodiment, the control element has the capability of directing the function modules to collectively carry out at most four elemental machine operations in one instruction cycle.

The preferred embodiment of the invention further features a control element comprising a master clock generating means for generating a timing signal marking at least the beginning of each instruction cycle. The control element further features a program control unit responsive to the timing signal for fetching successive instructions from a program memory. A circuit responsive to the program control unit, for providing source and destination addresses on the buses, is also provided; and further circuitry responsive to the program control unit enables the bus enable lines.

The master clock generating element according to the preferred embodiment of the invention, further features a clock generator having circuitry responsive to a selected state of a clock enable output of at least one function module for inhibiting the generation of the timing signal.

DESCRIPTION OF THE DRAWINGS

These and other objects, features, and advantages of the invention will appear from the following description of a preferred embodiment taken together with the drawings in which:

FIG. 2 is a schematic representation of the machine cycle timing of a processor constructed according to the invention, with specific reference to the rectangular waveform of the bus clock signal;

FIG. 3 is an electrical block schematic of a typical interconnection between a function module and the data buses;

DESCRIPTION OF A PREFERRED EMBODIMENT

System Structure

Figure 1:
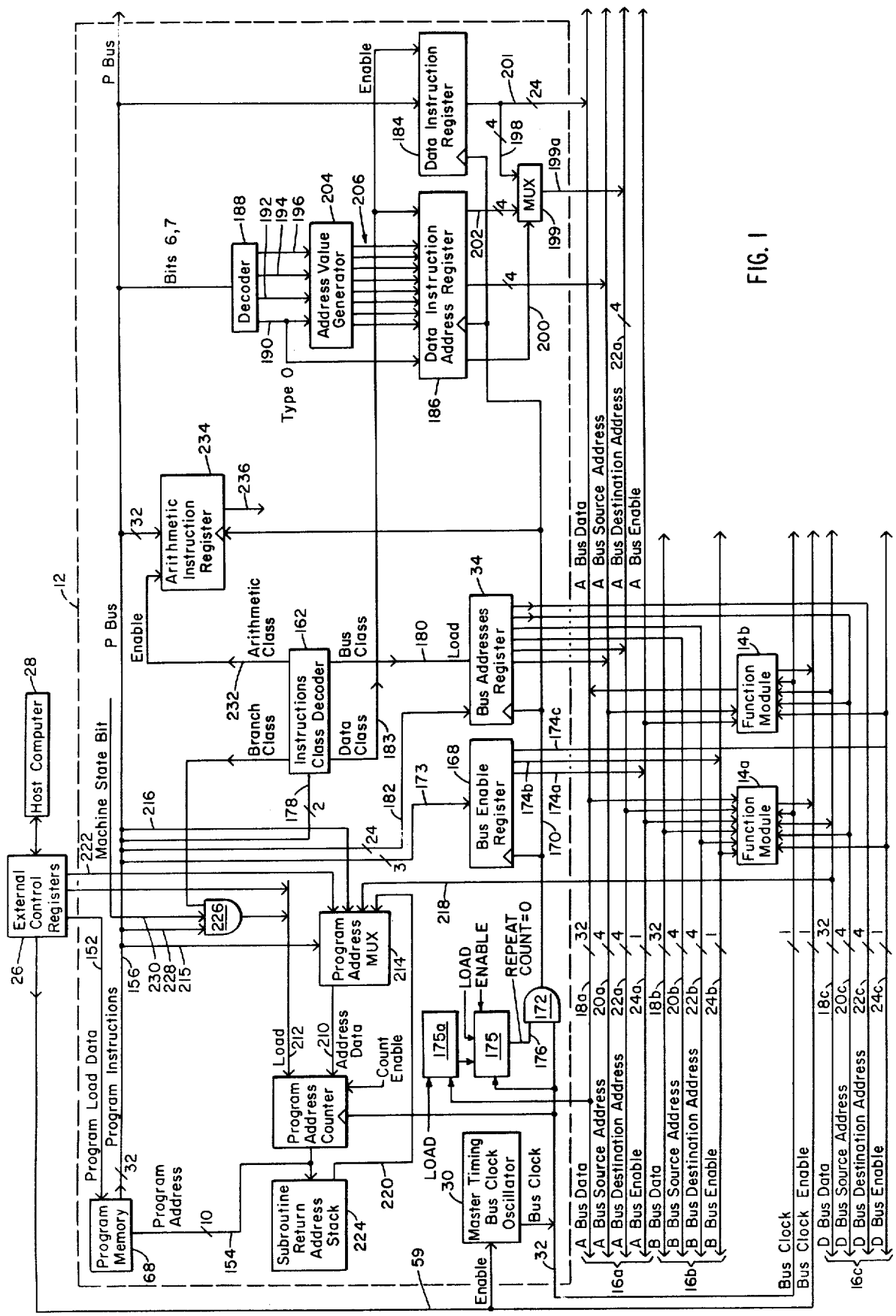
FIG. 1 is an electrical block schematic of a processor constructed according to the preferred embodiment of the invention.

Referring to FIG. 1, a processor constructed and structured according to the invention can be conveniently divided into a control element 12, a plurality of elementary function modules 14a, 14b, ..., and a plurality of buses 16a, 16b, 16c. Each bus comprises a plurality of individual electrical lines, the lines being organized into groups. Each bus of the illustrated embodiment comprises a group of thirty-two bus data lines 18a, 18b, 18c, ..., a group of four bus source address lines 20a, 20b, 20c, ..., a group of four bus destination address lines 22a, 22b, 22c, ..., and a group comprising a single line for enabling a respective bus, the bus enable lines 24a, 24b, 24c, ... In other embodiments of the invention each group can comprise greater or fewer lines depending upon the particular application for which the processor is being used. In order to provide clearer figures, where a single line of a drawing is intended to represent more than one individual electrical line, a single slash has been placed across the drawing line and the number of lines represented thereby has been inserted on the figure next to the slash. This convention has been adopted to enable a clearer understanding of the operation and function of the preferred illustrated embodiment and is not intended to either limit or restrict either the description of the preferred embodiment of the invention or the claims.

Similarly much of the detailed individual line structure for the preferred embodiment of the invention has been omitted so that the basic important features of the processor may be more clearly described and understood. The omitted material relates to the various details of implementation and would be obvious to one skilled in the computer arts in view of the following description.

The illustrated processor further includes a plurality of external control registers 26 through which the processor communicates with and is controlled by a host computer 28 for example for loading a computer program into the control element 12, for transmitting the result of a computation from the processor to the host computer, and for enabling other interactions between the host computer and the processor as described below.

The operation of the processor is synchronous with the bus clock output or timing signal of a master bus clock oscillator 30 over a bus clock line 32. Typically, the clock output over bus clock line 32 is a square wave function (FIG. 2a) having fundamental repetition rate of approximately 8 MHz. The repetitive rectangular waveform on line 32 is connected to all function modules 14, in the illustrated embodiment, and the positive going transition of the "bus clock" marks the time boundary between the execution of successive computer instructions. Thus, one complete cycle of the bus clock signal is identical to one machine "instruction cycle". As described in more detail later, the bus clock output may also be held up or stopped if, for example, an addressed function module is not ready to respond at the next regularly timed positive going bus clock transition when called upon to do so.

Referring to FIGS. 1 and 2, each bus source address on lines 20a, 20b, 20c, ..., designates the function module(s) which will be the source(s) of data to be placed on the respective bus data lines, and each bus destination address on lines 22a, 22b, 22c, ... designates the function module(s) which will receive the data on the respective bus data lines. The source and destination addresses are placed on the respective buses by a bus addresses register 34 of control element 12 and the addresses are valid from at least near the beginning of an instruction cycle, shortly after the positive going bus clock transition until the end of an instruction cycle as described in more detail in connection with the "bus class" instructions. The bus address source and destination address signals are applied to the function modules 14 connected across the respective buses and are decoded by the function modules, for example, as follows.

Referring to FIG. 3, a typical function module 14 is connected to buses 16a and 16b. Function module 14 comprises a destination address decoder circuitry 40, a source address decoder circuitry 42, gating circuitry 44a, 44b, a bus input register 46, a bus output gated drive element 48, and a function circuitry 50. If the function module 14 is addressed as the destination module, the output line 52 of destination address decoder circuitry 40, which can be, for example, a one of 16 decoder, becomes true. If the bus enable line 24a, corresponding to the destination address, is enabled, the output of gating circuitry 44a is true, and at the next positive going transition of the clock signal on bus clock line 32, the bus input register 46 is loaded with the data on bus lines 18a.

The output of function circuitry 50, if this function module 14 is designated as the source address on lines 20b, is gated onto data lines 18b. In operation, the output over line 54 of source address decoder circuitry 42, which may be a one of 16 decoder, becomes true if the function module is designated as the source address. If the corresponding bus enable line 24b is true, the gating circuitry 44b provides a true output over line 56 and the output of function circuitry 50 over lines 57, is passed through gated drive element 48 and is applied to the bus data lines 18b over output lines 58.

The illustrated function modules are also provided with means for temporarily inhibiting the generation of the next positive going transition of the bus clock. This is important if, for example, the module is not ready to receive or transmit data at the next normally occurring positive going transition. The operation of the bus clock oscillator is controlled by the signal level of bus clock enable line 59. Each function module 14 is connected to the enable line 59 preferably through a gating circuit 60 which forces a selected output signal level on line 59 whenever the function circuitry 50 is not ready to receive data at register 46 or transmit data at gates 48 (as indicated by a true signal level on a line 61) and a corresponding enable line output from gates 44a or 44b respectively is true. The output of gating circuit 60, releases line 59, restarting the clock, when the function circuit has completed its task (as indicated by a false signal level on line 61).

Referring to FIG. 2, the timing requirements for the various bus and data signals require that the bus data lines only need be valid during the time duration immediately surrounding the positive going transition of the bus clock (FIG. 2(c)). Correspondingly, the output of bus input register 46 will be valid at all times except a short time duration immediately following the positive transition of the bus clock line during which the bus input register is loaded (FIG. 2(d)).

Figure 4:
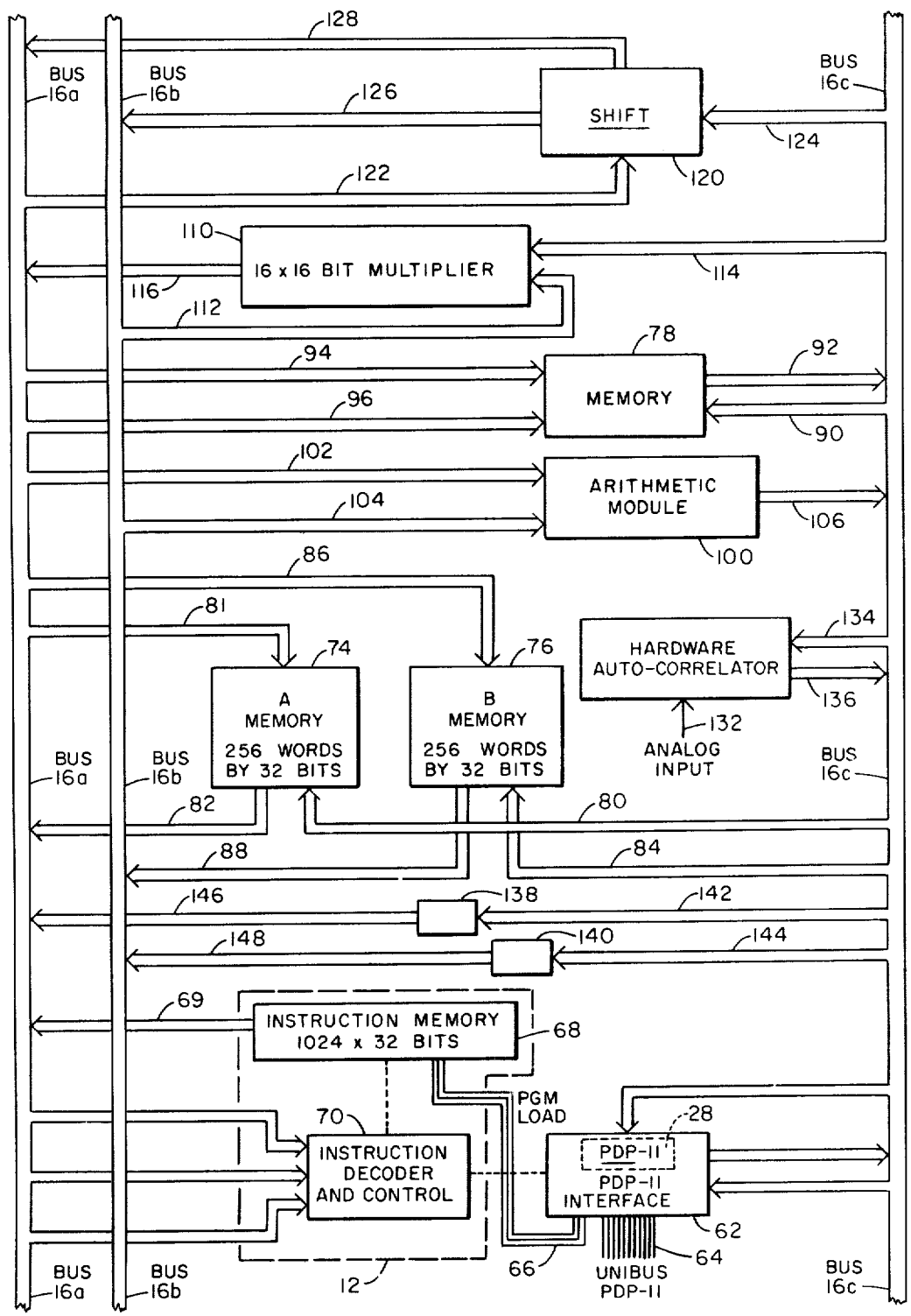
FIG. 4 is a block diagram representation of a typical preferred configuration of the function modules connected to the processor buses.

Referring to FIG. 4, the illustrated processor according to the invention, is structured to aid in the real time analysis of speech signals according to the apparatus of U.S. Pat. No. 4,038,503, issued July 26, 1977. The processor has three buses 16a, 16b, 16c, to which are connected the plurality of function modules and typically the host computer.

Thus, the apparatus of the invention is typically connected to and operates in conjunction with a host computer 28, which may be for example, a PDP-11, having a standard PDP-11 interface 62. The PDP-11 is connected to bus 16c and can be either the source or destination of data on the bus. The PDP-11 is also connected through its Unibus 64 and load lines 66 to an instruction or program memory 68 into which the program for controlling operation of the processor is loaded and stored. The instruction memory 68 may be, for example, a random access memory having 1024 words of 32 bit memory and is connected to bus 16a over lines 69.

The control element 12 comprises the program memory 68 and an instruction decoder and control element 70 (FIGS. 1 and 4). Element 70 is connected to the instruction memory directly and to the PDP-11 through the external control registers 26 (FIG. 1).

The illustrated preferred embodiment of the invention has three memories in addition to program memory 68, namely: scratch pad memories 74 and 76 ("A" memory and "B" memory respectively) and a larger memory 78. Scratch pad memories 74 and 76 may be, for example, RAM's (random access memories) having 256 words of 32 bit memory. Memory 78 is a larger memory having for example 65,536 words of 32 bit memory.

Memories 74 and 76 each include an address autoincrement function which can be set, if desired, to add a count of one from the memory address register, each time a memory data word is read or written. Memories 74 and 76 may also be selected to be either autoincrementing or autodecrementing, that is, to add or subtract a count of one from the memory address register each time the memory data word is read or written.

Memory 74 can be loaded with data from the bus 16c data line 18c over lines 80. The memory address at which the data is written is loaded from bus 16a data lines 18a over lines 81. The output of memory 74 is provided solely to bus 16a data line 18a over lines 82. In a similar fashion, memory 76 can be loaded from bus 16c over lines 84 and the memory address at which data is written is provided from bus 16a over lines 86. The output of memory 76 is available only to bus 16b over lines 88.

Memory 78 is loaded with data from bus 16c data lines 18c over lines 90 and provides an output solely to bus 16c over lines 92. The memory address at which data is loaded into the memory is provided from bus 16a over lines 94, and a memory function, used to indicate the desired memory data word length in eight bit bytes and an address autoincrement function, if desired, is loaded into memory 78 from bus 16a over lines 96.

The processor is further provided with an arithmetic module 100 which receives data from bus 16a data lines 18a over lines 102 and from bus 16b data lines 18b over lines 104. The output of the arithmetic module is available to bus 16c over lines 106.

Memories 74, 76, 78, and arithmetic module 100 comprise the core of the processor. In addition there may be provided, as needed, any of a plurality of additional function modules. One particularly useful function module for analyzing and correlating arrays of data, is a 16×16 bit multiplier 110 which receives its input data from bus 16b over lines 112 and from bus 16c over lines 114. The output of the multiplier is available to bus 16a over lines 116. Similarly, a 32 bit shifter module 120 is provided with control input data from bus 16a over lines 122, and with input data from bus 16c over lines 124. The output of the shifter 120 is available to bus 16b over lines 126 and to bus 16a over lines 128. The illustrated processor, which, as noted above, is used in speech analysis, is also typically provided with an autocorrelator module 130 having an analog input over a line 132, for example an analog speech representing input, and digital data inputs from bus 16c over lines 134. The output of the autocorrelator is available to bus 16c over lines 136.

The flexibility of the processor is further increased by connecting the data lines of bus 16c to the data lines of buses 16a and 16b respectively through gates 138, 140 respectively. The gates 138, 140 behave like function modules except for the absence of clocked registers and are connected to bus 16c over lines 142, 144 respectively and provide outputs to buses 16a and 16b over lines 146, 148 respectively.

SYSTEM OPERATION

Referring again to FIG. 1, program instructions are stored in the program memory 68 which, in the illustrated embodiment, cannot be modified by the control element 70 of the processor. A sequence of program instructions is loaded into the program memory from the external host computer 28, such as the PDP-11 noted above. Program instructions are loaded over a special control interface connection 152. The program memory contains a sufficient number of 32 bit instruction words to hold an entire processor program.

The processor is started by initializing a program address counter 158 whereby a single memory word corresponding to the memory address from the counter 158 over lines 154, and representing a single instruction, is made available over program output bus lines 156. The memory word, which contains the next program instruction to be executed, is thus "addressed" by the output of the program address counter 158 over lines 154. Thereafter, the processor, which runs when the clock enable line 59 is released, executes the stored program by executing the instructions according to the program sequence.

When the clock enable line 59 is released, the bus clock oscillator 30 oscillates and produces bus clock signals over bus clock line 32. At each positive going transition of the bus clock signal, the instruction then present on bus 156, or information derived from or depending thereon, is loaded into an instruction register selected by the two low order bits (bit 0 and 1) of the instruction word on lines 156. These two bits, the "operation code," identify the "class" or type of the instruction and identify the instruction register into which the information bearing portion of the instruction is loaded. The four types of instructions defined by the two bits are the "arithmetic class" (code 00), "data class" (code 01), "bus class" (code 10), and "branch class" (code 11) instructions. The operation code is decoded by an instruction class decoder 162 which produces a true output on that output line corresponding to the class of instruction then appearing on lines 156.

As noted above, each instruction word includes two bits, bit 0 and bit 1, which denote the class or type of the instruction. In addition, there are four additional bits which have an unchanging meaning for all instruction words. Three of these bits, bits 3, 4, and 5, correspond to the three bus enable signals over bus enable lines 24a, 24b, 24c of buses 16a, 16b, and 16c respectively. The three bits are monitored by a bus enable register 168. At the beginning of each machine instruction cycle, which is indicated by the positive going transition of the gated clock signal over a line 170 from gate 172, register 168 loads the three bus enable bits from the instruction word, available over lines 173, and provides at its outputs 174a, 174b, and 174c the driving signals to enable, if so selected, the respective bus enable lines. In this manner, the bus enable register 168 determines whether or not data can be transmitted or received on each bus during an instruction cycle.

The fourth bit common to each instruction is called the "repeat bit" and causes the instruction with which it is associated to be repeated repetitively until a "repeat counter," 175, loaded in response to the "repeat bit" from an associated repeat register 175a counts down to zero. The repeat register had been previously loaded with a program selected number. When the repeat bit is true and the repeat counter output is non-zero as indicated by a false signal level over a line 176, the program address cannot change and the several instruction registers cannot be loaded; however, the bus clock oscillator 30 continues to run permitting data transfers to take place on the buses as directed by the contents of the unchanging instruction registers.

INSTRUCTION CLASSES

Bus Class Instructions

Referring to FIG. 1, if the operation code received by the instruction class decoder 162 over lines 178 is "10", a line 180 is enabled to load the 24 high order bits of the instruction word, over lines 182, into the bus addresses register 34 at the beginning of the next machine cycle. The data over lines 182 are stored and made available to define the source and destination addresses over lines 20a, 20b, 20c, and 22a, 22b, and 22c. Each address in the illustrated embodiment consists of a four bit word, and therefore, up to 16 different function modules can be connected and addressed by the source or destination addresses of each bus. The contents of the bus addresses register 34 can be modified only by executing another bus class instruction and are otherwise held in a constant state for all successive instruction cycles. The bus addresses register can then be set at the beginning of a sequence of instructions to configure the machine, and hence set the flow of data according to a desired pattern.

DATA CLASS INSTRUCTION

If the operation code of an instruction word on bus lines 156 is "01", an output line 183 of the instruction class decoder is enabled and indicates the presence of a "data class" instruction. The data instruction register 184 and the data instruction addresses register 186 are thereby enabled; and at the start of the next machine instruction cycle, bits 8-31 of the output of the program memory over bus lines 156 are loaded into the data instruction register and data derived from bits 6 and 7 of the instruction are loaded into the data addresses register 186.

Bits 6 and 7 of the instruction enable one of the output lines 190, 192, 194, 196 of decoder 188 (depending upon the input bit configuration), to identify the type of data class instruction. Thus, for example, if bits 6 and 7 are both zero, line 190 is enabled and the bus 16a destination address on lines 22a, normally provided by bus addresses register 34, is temporarily supplanted by four bits taken from the data instruction word. The four instruction word bits specifying the bus destination address are available over lines 198 from the data instruction register 184 and are applied to the bus destination address lines 22a through multiplexing element 199. The output of multiplexing element 199, over lines 199a, is selected by a signal level generated by register 186 over a line 200. The remaining twenty bits of the instruction word are available over lines 201, and are made available as data to the bus 16a when the bus is enabled by bus enable register 168.

On the other hand, if the bit 6 is a one and bit 7 is a zero, a special address code is temporarily forced onto bus 16a destination address lines 22a from multiplexing element 199 connected to data addresses register 186 over lines 202. Simultaneously, 24 bits of data are available on the bus data lines 18a from data instruction register 184 over lines 201 when the bus 16a is enabled. If selected bits of the instruction, as noted below, are true, this special address designates up to three function modules to receive portions of the data on lines 18a. The special address is generated by an address value generator 204 and is available from the generator 204 over lines 206 to the addresses register 186. As a result, the repeat register 175a is loaded at the time of the next positive going clock transition with a six bit binary number (bits 26-31 of the instruction word). If bit 24 of the instruction word is also true, bits 8-15 of the instruction word are loaded as a binary number into the memory 74; and if bit 25 of the instruction is true, the remaining 8 bits, bits 16-23 of the instruction word, are loaded as an eight bit binary number into memory 76. This data class instruction, therefore, (that is, when the operation code bits 6 and 7 are one and zero respectively), combines, in the illustrated embodiment, three frequently used data class instructions into a single instruction, thereby often resulting in a considerable saving in both time and program storage space.

If bits 6 and 7 are written as "11", a selected portion of the instruction word is loaded into the external control registers 26 for signaling purposes or for causing an interrupt to occur in the external host computer.

In the illustrated embodiment, the operation code designation "01" (for bits 6 and 7 respectively) is not used.

BRANCH CLASS INSTRUCTION

The next class of instructions, the branch class, is designated by the operation code "11". An instruction in this class, allows the normal sequence of program instruction execution to be altered, depending on whether or not one or more of condition code bits set by the instruction word are satisfied.

At the completion of each instruction cycle, the positive going clock signal transition over line 32 normally causes the program address counter to increment, by one, the numerical address input to the program memory 68 over line 154. Thus, after the instruction word present at the output of the memory at the moment of the clock positive transition is latched into the respective instruction register, the instruction word at the next sequential address is fetched from the program memory. If the next instruction word is a branch class instruction, a decision is made, prior to the next positive going clock transition and depending upon the condition code bits set in the instruction word, to branch or not branch. If the decision is to branch (indicated by a true or high signal level over a line 212), then instead of incrementing the program address counter 158 on the next bus clock positive transition, numerical address signals, applied to the input of the program address counter over lines 210, are loaded into the address counter and supplant the present contents of the program address counter. The instruction words at that new address location are then fetched and executed in sequence (unless another branch instruction is encountered).

The address signals applied to the input terminals of the program address counter over lines 210 may be selected from one of four sources by the two control input signals applied to a program address multiplexer 214 over lines 215. The control input signals over lines 215 correspond to bits 20 and 21 of the instruction word available over program bus lines 156 from the program memory. The four potential sources of new address information are: bits 22-31 of the instruction word appearing on lines 156; the data in bits 0 through 9 of bus 16c data lines 18c; the output of a subroutine return address register; and the output of an external control interface register 26, the inputs being available over lines 216, 218, 220, 222 respectively.

The decision to branch or not to branch is controlled by a gating circuit 226 in which each of the instruction bits 8 through 18 (on lines 228 from lines 156), the condition code bits, is compared respectively with a corresponding one bit signal (over lines 230) representing a respective machine state to be tested. If an instruction bit and the corresponding machine state bit are both true, and if the instruction being fetched is a branch instruction, then the branch is executed by enabling the program address load line 212 through gating circuit 226 to load the new address on lines 210 at the next positive going clock transition. Otherwise, the program address counter is incremented in the normal fashion and the next sequential instruction word is fetched.

As a convenience, bit 9 of the branch instruction word corresponds to a machine state bit which is always in the true state and hence a branch instruction with this condition bit set is an unconditional branch.

The subroutine return address register 224 referred to above, is used to enable the processor to efficiently execute subroutines. The register 224, whenever bit 19 of a branch instruction is true is loaded with the current value of the program counter contents plus one, bit 19 corresponding to a "jump to subroutine" instruction. Thus, in addition to the conditional branch instructions, the branch class instruction also includes unconditional branches. At the end of the subroutine, the original contents of the program counter are thus replaced in the address counter so that the sequential instruction following the "jump to subroutine" branch class instruction can be executed. The return address register 224 is preferably capable of storing several address values arranged in a last in and first out register stack so that nested subroutine programs can be carried out.

The illustrated processor also includes two loop counters (not shown) which advantageously enable a group of instructions to be executed, repeatedly, a selected number of times. The selected loop counter is loaded with a selected number using a data class instruction prior to entering the repeating group of instructions. Then, at the end of the group of instructions, a branch class instruction is used to cause a branch to the beginning of the group of instructions if the loop counter is not zero. If a branch is made, the loop counter decremented by one. If the loop counter equals zero to the time of a positive going clock signal transition, the branch is not made, and the next sequential instruction in the list is fetched and executed.

ARITHMETIC CLASS INSTRUCTION

The last instruction class, corresponding to an operation code of "00" is the arithmetic class instruction. In the illustrated embodiment, when an arithmetic class instruction is present on lines 156, a line 232 from the instruction class decoder 162 is enabled and at the next positive going clock transition, bits 6–31 of the instruction are loaded into an arithmetic instruction register 234. The output of the arithmetic instruction register 234 over lines 236 controls the operation of the arithmetic module 100. The bit assignments for the arithmetic class instruction are outlined in FIG. 6.

Figures 5, 6:
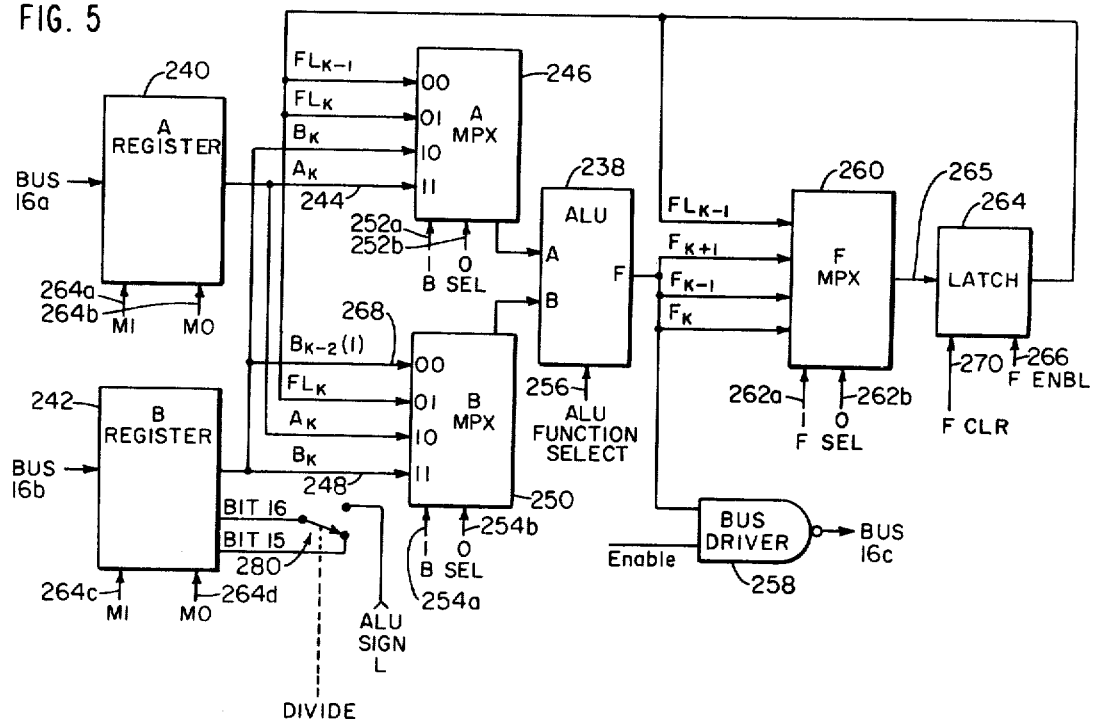
FIG. 5 is a detailed electrical circuit diagram of the configuration of an arithmetic module according to a preferred embodiment of the invention.
FIG. 6 is a diagrammatic representation of the function of the logic bits comprising an arithmetic instruction for controlling the arithmetic module.

Referring to FIG. 5, the arithmetic module 100 is the primary element for performing arithmetic and logic operations in the processor and comprises at its core a dual 16 bit arithmetic and logic unit (ALU) 238. ALU 238 is connected through the illustrated circuit arrangement to other function modules on the buses 16a, 16b, 16c. The detailed operation of the arithmetic module 100 is controlled by the arithmetic instruction register 234 over lines 236. The instruction bits stored in register 234 control the signal flow within (and configuration and function of) the arithmetic module.

The arithmetic module further comprises an "A" input register 240, having a 32 bit data input from the bus 16a, and a "B" input register 242, having a 32 bit data input from bus 16b. The output of the "A" register 240 is provided over lines 244 as one input to an "A" multiplexing element 246. The output of the "B" register 242 is provided over lines 248 as one input to a "B"

multiplexing element 250. Multiplexing elements 246 and 250 each have four possible inputs, one of which is selected by control signals over lines 252a, 252b and 254a, 254b respectively from the arithmetic instruction register. The output of the multiplexing elements is applied to the ALU whose function is controlled by the signals on control lines 256 from the arithmetic instruction register. The output of the arithmetic logic unit is made available to bus 16c through a gating element 258 and also is applied as one input of a third multiplexing element 260 whose selected output is controlled by the signals over control lines 262a, 262b from the arithmetic instruction register. The output of the multiplexing element 260 is provided to an "F" latch storage register 264.

As noted above, the function performed by the arithmetic module is determined by executing the arithmetic class instruction; and thereafter the arithmetic module continues to perform the same function (with certain exceptions noted below) until the arithmetic instruction register is changed by executing another arithmetic class instruction. As noted above, the arithmetic class instruction bits stored in the arithmetic instruction register identify the arithmetic or logical function to be performed by the ALU, and further, identify the input source for multiplexing elements 246, 250, 260, and the operations, if any, of registers 240, 242, and 264 as described below.

"A" register 240 and "B" register 242 are each four function bidirectional shift registers which are independently controlled over lines 264a, 264b and 264c, 264d respectively to perform an arithmetic shift up, an arithmetic shift down, a hold, or a load operation. All 32 bits of the "A" register 240 are affected by the load, hold, or shift operations. In the "B" register, however, all 32 bits are affected for each operation only if the "divide bit" (bit 15) of the arithmetic instruction is not set. When this bit is set, during a shift up operation, the bit shifted up from bit 15 of the "B" register is lost and a quotient bit is shifted into bit 16. The "A" and "B" registers 240, 242, are loaded from buses 16a and 16b respectively only if a "load" code appears in the field of the arithmetic instruction; and the registers may be loaded when the arithmetic class instruction is executed or when the arithmetic module is designated as the destination address during execution of a data class instruction.

The "F" latch register 264 is a 32 bit clocked latch register which may load, through multiplexing element 260, the output of the arithmetic and logic unit 238 with an arithmetic shift of plus 1, 0, or minus 1 bits, and it may be loaded with its own output arithmetically shifted up by 1 bit. The top sixteen bits (bits 16 through 31) and the bottom 16 bits (bits 0 through 15) on input lines 265 are latched into the "F" latch register 264 by independent instruction bits (bits 24 and 19 respectively) of the arithmetic instruction. In addition, the state of the register 264 cannot change unless the current instruction is an arithmetic class instruction and one or both of the register enable bits over lines 266, that is, the high enable bit 24 or the low enable bit 19 of the arithmetic instruction, are set.

The "F" latch register 264 cannot be accessed directly from any of the data buses. Information received at the inputs of register 264 and arithmetic and logic unit 238 is controlled by the three four position multiplexers 246, 250, 260 and, as noted above, except for the input from register 242 over a line 268, all 32 input bits of each input line are affected similarly by the multiplexer settings. The control lines for the multiplexers are set at the arithmetic instruction register when the arithmetic instruction is loaded.

As noted above, the ALU 238 has two inputs from multiplexing elements 246, 250 respectively. The input from multiplexer 246, as determined by control bits of the arithmetic instruction register is either the output of the "A" register 240, the output of the "B" register 242, the output of the "F" latch register 264, or the output of the "F" latch register 264 shifted down by one bit. Similarly, the input from multiplexing element 250 to the arithmetic logic unit is either the output of the "B" register 242, the output of the "A" register 240, the output of the "F" latch register 264, or the high sixteen bits from the "b" register shifted up two bits as ALU input bits 16 through 31 in combination with the high sixteen bits from the "F" register 264 as ALU input bits 0 through 15, an effective shift down of 16 bits. The latter capability is useful when the 32 bit processor word is split into two sixteen bit words to be transmitted sequentially to an external device such as the host computer.

As noted above, the output of the ALU 238 can be gated onto the bus 16c, in the illustrated embodiment, whenever the arithmetic module 100 is specified as a source address. This output reflects the function specified by the most recent arithmetic class instruction operating on the "F" latch register 264 as then loaded and on the data most recently loaded into the "A" and "B" registers 240, 242, for example, by a data load instruction. (The contents of registers 240, 242, 264 are retained even if the processor is not running but the arithmetic instruction register is cleared to zero whenever the processor is halted.)

The arithmetic and logic unit 238 may be type 74S181 manufactured by Texas Instruments Company. This unit is described in the Texas Instruments "TTL Data Book for Design Engineers", 2nd et., 1976, at page 7-271. The function of the arithmetic and logic unit is controlled by eight bits of the arithmetic instruction which allow the high order bits, bits 16 through 31 to be operated upon independently of the low order bits, bits 0 through 15.

The arithmetic class instruction also contains several special purpose function bits. If bit 25 is set, all 32 bits of the "F" register will be cleared to zero, after the arithmetic register is loaded at the beginning of a machine cycle, by a signal level over line 270 from the arithmetic instruction register. This occurs only if an arithmetic class instruction is being executed. If bit 17 of the arithmetic instruction is set, all 32 bits of the "A" register 240 will be cleared to zero after the arithmetic register is loaded at the beginning of a machine cycle and the arithmetic control signals are arranged to take the two's complement absolute value of the contents of the "B" register 242. If bit 81 of the arithmetic instruction is set, then bits 16 through 31 of the "B" register are cleared to zero and the control signals are arranged for accumulation of the number in bits 0 through 15 of the "B" register as if it were a sign extended 32 bit number.

Bit 15 of the instruction is used for arithmetic division of non-negative numbers. The full instruction code for a 32 bit divide step is, in octal notation, 03522166704. This code normally instructs the ALU to subtract its input from multiplexer 250 and derived from the "F" register 264 (which holds the numerator) from its input derived from the "A" register 240 (which holds the denominator) through multiplexer 246, and at the same time enables loading of the "F" latch register 264 with its own input shifted up by one. The divide bit enables a gate (not shown) to intercept the control bit on line 262a to the multiplexer 260 in such a way that if the result of the subtraction is zero or positive, the bit is set to one, causing the output of the ALU, shifted up one bit, to pass through the multiplexing element 260 to the "F" register 264 input. Otherwise, if subtraction results in a negative number indicating that the denominator does not go into the numerator, the effect of the instruction is to shift the content of the "F" register 264 up one bit. In the meantime, the "B" register control lines have been set to shift its contents up one bit, and with the divide bit set, the complement of the ALU output sign bit is shifted into bit 16 of the "B" register 242. Thus on completion of the instruction, twice the current remainder is loaded into the "F" register and the current bit of the quotient is shifted up into the high order end of register 242. The instruction must be repeated to develop the desired number of quotient bits in the "B" register 242.

Bit 16 of the arithmetic class instruction is used to perform step by step multiplication in an analogous fashion. The instruction code for fractional multiplication (that is, add and shift down) is 16512273004. This operation is well known to those skilled in the computer art, and will not be described further here.

GENERAL OPERATION

Pipeline processing, which can be achieved with the claimed processor, can be understood from the following example, in which several function modules are used to execute a sequence of arithmetic additions. The addends are obtained sequentially from memories 74, 76 and the sequence of sums is written into memory 78. Throughout the computation, the memories 74 and 76 are designated as the data source addresses on the buses 16a and 16b respectively. Memory 78 is designated as the destination address on bus 16c, the arithmetic module 100 input registers 140, 142 are designated the destination address for data on buses 16a and 16b respectively, and the output of the ALU 238 is designated as the source address on bus 16c.

The first instruction after initializing the memory addresses and the arithmetic instruction register causes the first two addends to be fetched respectively from memories 74 and 76 during the first machine cycle of the computation. At the end of this first cycle, these first addends input values are loaded into the arithmetic module 100. Since a valid result is not yet available from the arithmetic module at the end of the first machine cycle, the bus 16c enable line 24c is held false during the first cycle to prevent data from being written into memory 78. During the second instruction cycle, the arithmetic module computes the sum of the first two addends (which are now loaded into registers 140, 142); the bus enable line 24c is held true to permit transfer of that sum to the input of memory 78 at the beginning of the next (third) machine cycle; and the second pair of addends is fetched from memories 74 and 76 and are made available to buses 16a and 16b. (The sequential "fetching" from memories 74, 76 and the sequential writing into memory 78 is accomplished using the auto incrementing function feature of memories 74, 76, and 78 as noted above.) Thus, at the end of the second instruction cycle the first sum is transferred to memory 78, and the second pair of addends is loaded into the input registers 240, 242 of the arithmetic module 100. Referring then to FIG. 2, line (a'), at the end of each subsequent instruction cycle, the sum of the addends transferred during the previous cycle appears at the arithmetic module output and is transferred to memory 78 over bus 16c and a new pair of addends from memories 74, 76 is loaded into the arithmetic module. Thus four elemental operations are performed during each instruction cycle. There is an arithmetic operation, the operation of writing into memory 78, and two independent operations of reading from memory 74 and memory 76. On the last instruction cycle, no addends are required so the bus enable lines 24a and 24b are held false or disabled and the last sum is written into memory 78. A sequence of additions, arranged in this manner, only requires, after the system configuration is set up, M+1 instruction cycles to complete even though each single addition requires two instruction cycles (that is fetching from memory and the subsequent addition and data storage). The time saving which approaches a factor of two, is created by the pipelined arrangement of the arithmetic module input registers and the memory 78 input register. In other processor computations more function modules may be interconnected via the three buses to compress as many as four elementary operations, for example, read operand, compute, compute, and store result, into a single instruction cycle during repetitive calculations.

As noted above, each bus in the illustrated embodiment has provision for up to sixteen data sources and sixteen data destinations. The source(s) and destination(s) of the data are not rigidly structured. Thus, a single function module may correspond to one or more source and/or destination addresses. Typical is the arithmetic module 100 which has two destination addresses but only one source address. Similarly, the function modules are not rigidly structured and may be any of a variety of different units which perform elementary operations. As noted in the illustrated embodiment, they may be general purpose memories, shift registers, arithmetic elements, or special purpose devices such as the autocorrelator or the sixteen bit by sixteen bit multiplier 110. In those instances where the function module requires more than one machine cycle to finish its operation, such as multiplier 110, the module may temporarily stop the master clock in order to complete its function prior to the next positive going clock transition.

The apparatus is thus substantially completely flexible with respect to the programmed configuration of the apparatus; that is, the direction and paths of data flow are unrestricted except that a designated module source address can only receive data and a designated module drive or output can only transmit or send data onto a bus. The disclosed processor thereby provides a maximal degree of flexibility for providing a pipelined processing system wherein information is passed from one module to another under program control so that substantial time savings may be achieved.

In addition to providing the flexibility of setting up many signal flow paths between modules, the invention provides the additional flexibility, that once the flow paths are set up, they need not all be used at any particular instance or during any particular instruction step. Thus, unless the corresponding bus enable line 24 is true, the flow path designated along a particular bus will not be enabled.

It will be obvious to those skilled in the art that various additions, subtractions, deletions, and modifications of the disclosed preferred embodiment can be made without affecting the scope or underlying operation of the processor. Thus, more than three bus lines can be used, the instruction word length can be varied and bit assignments can be changed to suit the particular application to which the processor is assigned. Also, more, less, or different function modules can be used depending upon the particular application, and different instructions or instruction sets can be implemented and the particular structure of the control element 12 can also be changed to match the changing instruction sets. Such modifications of the illustrated preferred embodiment are well within the skill of one in the computer arts and are considered to be within the scope of the following claims.

What is claimed is:

1. A computing apparatus comprising
   a plurality of elementary function modules,
   at least three buses, each bus comprising a plurality of individual lines, said individual lines being organized at least into
      a group of source address lines,
      a group of destination address lines, and
      a group of data carrying lines,
   a first one of said function modules being connected at least to the data and one other group of lines of a first one of said buses, a second one of said modules being connected at least to said data and one other group of lines of a second one of said buses, a third one of said modules being connected at least to the data and one other group of lines of a third one of said buses and a fourth one of said modules being connected at least to the data and one other group of lines of each of the first, second, and third buses,
   each other of said plurality of modules being connected at least to said data and one other group of lines of a respective bus whereby each source and destination group of each of said plurality of buses is connected to at least one of said plurality of function modules, and each data group of each of said plurality of buses is connected to at least two of said plurality of function modules, and
   a control means, said control means being connected to all of said buses for directing the operation of said function modules, and said control means placing sequentially changeable source and destination addresses on said bus source address and destination address lines respectively for effectively connecting the function modules in a selected configuration.

2. The apparatus of claim 1 wherein each bus further comprises a bus enable line for signalling when the bus is enabled, each said bus enable line being connected to and controlled by said control means.

3. The apparatus of claim 1 wherein said fourth function module is an arithmetic module comprising
   a first input register connected to the data lines of the first bus,
   a second input register connected to the data lines of the second bus,
   an arithmetic and logic unit,
   a first multiple input multiplexing element having as one input the output of said first register and having a data output connected to the arithmetic and logic unit,
   a second multiple input multiplexing element having as one of its inputs the output of the second input register and having a data output connected to the arithmetic and logic unit,
   means for selectively connecting the arithmetic and logic unit to the data lines of said third bus, the arithmetic and logic unit having an output which is thereby made available by said selectively connecting means to said third bus, and
   means for further connecting said unit output to an input of a third multiple input multiplexing element whose output is connected to a latching storage register,
   the output of said latching storage register being provided as an input to at least one of said first and second multiplexing elements.

4. The apparatus of claim 1 wherein said control means further comprises means for sharing with a host computer a plurality of data storage registers and wherein said control means and said host computer can each write and read at least one of said shared registers.

5. A computing apparatus for carrying out a plurality of elemental machine operations during one instruction cycle of the apparatus comprising:
   a plurality of elementary function modules,
   at least three buses, each bus comprising a plurality of individual lines, said individual lines being organized at least into
      a group of source address lines,
      a group of destination address lines, and
      a group of data carrying lines,
   a first one of said function modules being connected at least to the data and one other group of lines of a first one of said buses, a second one of said modules each being connected at least to said data and one other group of lines of a second one of said buses, a third one of said modules being connected at least to the data and one other group of lines of a third one of said buses, and a fourth one of said modules being connected at least to the data and one other group of lines of each of the first, second, and third buses,
   each other of said plurality of modules being connected at least to said data and one other group of lines of a respective bus whereby each source and destination group of each of said plurality of buses is connected to at least one of said plurality of function modules, and each data group of each of said plurality of buses is connected to at least two of said plurality of function modules, and
   a control means, said control means being connected to all of said bus lines for directing the operation of said function modules and having the capability of effectively configuring the function modules by placing addresses on selected ones of said source and destination address lines of said at least three buses for carrying out said at least four elemental operations on a parallel basis within a said one instruction cycle, each elemental operation normally individually requiring up to the duration of one instruction cycle to complete.

6. The apparatus of claim 5 wherein each bus further comprises a bus enable line for signalling when the bus is enabled, each said bus enable line being connected to and controlled by said control means.

7. The apparatus of claim 6 wherein
   the number of buses is three,
   said function modules include
      at least three memory elements, and
      an arithmetic module, and said control means directs the operation of said memory elements and said arithmetic module for effectively configuring said function modules for carrying out at most four of said at least four elemental operations in one instruction cycle.

8. The apparatus of claim 7 wherein
said elemental operations include at least two memory read operations, and
at least two of the memory elements to be read are each autoincrementing memories which increment in response to a storage activation signal.

9. The apparatus of claim 6 wherein each function module comprises:
a function circuit for performing an elemental operation,
an input storage register connected to said function circuit for loading data from a bus, and
an output means for making data from said function circuit available to a bus.

10. The apparatus of claim 6 wherein said control means comprises:
a program storage memory,
a master clock means for generating a timing signal for marking at least the beginning of each instruction cycle,
a program control unit responsive to said timing signal for fetching successive instructions from said program memory,
means responsive to the program control unit for providing said source and destination addresses to said buses for configuring said modules, and
means responsive to the program control unit for enabling said bus enable lines.

11. The apparatus of claim 10 wherein said modules each comprise means responsive to said timing signal for reading the information available on the buses.

12. The apparatus of claim 10
wherein said master clock means further comprises means responsive to a selected state of a clock enable output of any of said function modules for inhibiting the generation of said timing signal whereby said any function module can complete a task designated by data input to the function module prior to the beginning of a next instruction cycle.

13. The apparatus of claim 6 wherein said control means further comprises means for repeatedly executing a selected control means instruction a preselected number of times by maintaining the same address signals on said source and destination lines for said preselected number of instruction cycle times.

14. The apparatus of claim 5 wherein said function modules comprise at least an arithmetic module and three autoincrementing memories each of which autoincrement in response to a memory actuating signal, and
said control means includes means for placing signals on said buses during each of a consecutive plurality of instruction cycles for simultaneously executing in one instruction cycle the elemental operations of
loading data from a first of said memories into a first location of said arithmetic module,
loading data from a second of said memories into a second location of said arithmetic module,
generating an arithmetic result from data loaded into said arithmetic module during an instruction cycle next preceding said one instruction cycle, and
storing a said arithmetic result from said arithmetic module in the third of said memories.

15. The apparatus of claim 5 further comprising
a master clock means for generating a repetitive timing signal for marking at least the beginning of each instruction cycle, said clock means being responsive to a clock control signal from any of said plurality of function modules for inhibiting generation of said timing signal whereby said any function module can complete a task designated by data input to the function module prior to the beginning of a next instruction cycle.

16. A computing apparatus for carrying out a plurality of elemental machine operations during one instruction cycle of the apparatus comprising
a plurality of elementary function modules,
a first, a second, and a third bus, each bus comprising a plurality of individual lines, said individual lines being organized into
a group of source address lines,
a group of destination address lines,
a group of data carrying lines, and
a group comprising at least one bus enable line,
a first one of said function modules being connected at least to the data, the bus enable, and one of the source and destination group of lines of said first bus, a second one of said function modules each being connected at least to the data, the bus enable, and one of the source and destination group of lines of said second bus, a third one of said function modules being connected at least to the data, the bus enable, and one of the source and destination group of lines of said third bus, and a fourth one of said modules being connected at least to the data, the bus enable, and one of said source and destination group of lines of each of said first, second, and third buses,
each other of said plurality of modules being connected at least to the data, the bus enable, and one of said destination and source group of lines of a respective bus whereby each bus enable, source, and destination group of each of said three buses is connected to at least one of said plurality of function modules,
each function module comprising
a function circuit for performing an elemental operation,
an input storage register connected to said function circuit for loading data from a bus and
an output means for making data from said function circuit available to a bus,
a control means, said control means being connected to all of said bus lines for directing the operation of the function modules and having the capability of effectively configuring the function modules by placing addresses on selected ones of said source and destination address lines of said three buses for carrying out said plurality of elemental operations on a parallel basis within a said one instruction cycle, each elemental operation normally individually requiring up to the duration of one instruction cycle to complete,
the control means comprising;
a master clock means for generating a timing signal for marking the beginning of each instruction cycle,
a program control unit responsive to the timing signal for fetching successive instructions from a program memory,
means responsive to the program control unit for providing source and destination addresses to said buses, and
means responsive to the program control unit for selectively enabling the bus enable lines.

* * * * *

UNITED STATES PATENT AND TRADEMARK OFFICE
CERTIFICATE OF CORRECTION

PATENT NO. : 4,228,498

DATED : October 14, 1980

INVENTOR(S) : Stephen L. Moshier

It is certified that error appears in the above-identified patent and that said Letters Patent are hereby corrected as shown below:

<u>PATENT AND TRADEMARK OFFICE ERRORS</u>

<u>In the specification</u>:

Abstract, line 1, insert --data-- before "buses".

Add the following paragraph after the Abstract:

--The invention herein described was made in the course of or under a contract with the Department of the Air Force.--.

Col. 2, line 33, insert --of the apparatus-- after "instruction cycle".

Col. 2, line 60, "means" should read --element--.

Signed and Sealed this

Ninth Day of June 1981

[SEAL]

*Attest:*

RENE D. TEGTMEYER

*Attesting Officer*     *Acting Commissioner of Patents and Trademarks*